Dec. 1, 1925.  
H. V. LOUGH  
GRAPPLING DEVICE  
Filed May 29, 1923

Inventor  
Hector V. Lough  
By his Attorney  
Ernest Hopkinson

Patented Dec. 1, 1925.

1,563,505

UNITED STATES PATENT OFFICE.

HECTOR V. LOUGH, OF HARTFORD, CONNECTICUT, ASSIGNOR TO THE HARTFORD RUBBER WORKS COMPANY, OF HARTFORD, CONNECTICUT, A CORPORATION OF CONNECTICUT.

GRAPPLING DEVICE.

Application filed May 29, 1923. Serial No. 642,270.

*To all whom it may concern:*

Be it known that I, HECTOR V. LOUGH, a subject of the King of England, residing at Hartford, county of Hartford, and State of Connecticut, have invented a certain new and useful Grappling Device, of which the following is a full, clear, and exact description.

This invention relates to grapples or tongs, and more particularly a type thereof suited for closing tire vulcanizing molds.

A general object of the invention is to provide a new and improved construction for facilitating the closing (or opening) of sectional articles or apparatus, such as molds used in the manufacture of tires. More particularly, it aims to provide an easily handled or manipulated grappling device or pair of tongs for closing (or opening) tire shaping molds sometimes used in the manufacture of pneumatic tire casings. It also endeavors to provide a reliable and sufficiently powerful device for the work to be done, which is quickly responsive and substantially foolproof against destruction. Other objects of the invention will appear hereinafter in connection with the detailed description of the device.

With the illustrated embodiment in mind and without intention to limit more than is required by the prior art, the invention consists, briefly, in a pair of articulated levers or tongs which are adapted to be operated by fluid pressure devices, including a relatively large cylinder and piston effective to move the levers in one direction and a relatively small cylinder and piston effective to move the grapples or tongs in the opposite direction. The fluid pressure devices are directly connected with the levers or tongs, both being mounted for swinging movement from a travelling carriage that may be shifted, whereby the grapping device may be readily swung to and from operative or working relation with the molds as well as shifted from one mold to another along an overhead support. The fluid pressure devices and tongs are, preferably, also balanced or arranged so that the levers will remain as left or released, either in a substantially vertical (working) position or an inclined or canted (out of the way) position, thereby facilitating access to or manipulation of the molds or other articles being treated.

An embodiment of the invention is illustrated in the accompanying drawings in which:—

Figure 3:
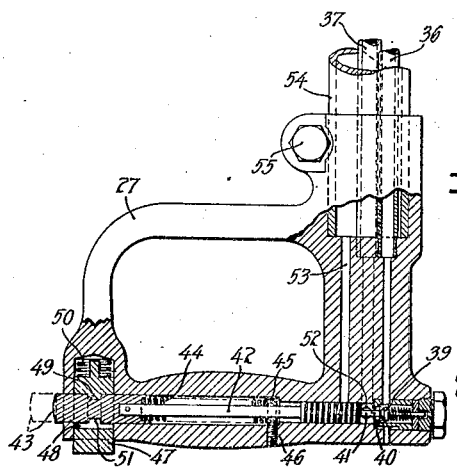

And Figure 3 is a sectional detail, showing the valved and bored construction of an operating handle carrying central buttons.

The invention is not limited to the specific embodiment illustrated and hereinafter described in detail. Its underlying principles, however, are set forth in connection with an embodiment thereof adapted for closing tire-shaping molds, a further disclosure of the use of the invention in connection with such types of molds being found in my co-pending application Serial No. 642,269, filed May 29, 1923.

Referring to the drawings of this particular embodiment of the invention, it comprises a pair of substantially identical levers or tongs 1, which are pivoted for turning movement on pins 2 mounted in a casting or head 3, which latter itself is hinged on a pin 4 sustained by the depending crescent-shaped bar or hanger 5, whose upper extremity is fixed to a carriage, indicated generally at 6, having suitably mounted rollers 7 for tracking an I-beam, or other lengthwise extending overhead support 8.

The carriage 6 and I-beam 8 permit the entire grappling device to be shifted bodily, as desired, from working relation with one mold to another, the molds being conveniently supported in vertical planes, at least by preference, by any suitable means, such as those detailed in the aforementioned co-pending application. But a carriage travelling on the floor and having uprights supporting the hangers 5 might be employed within the broad invention.

To operate the levers or tongs 1, their upper bent ends are loosely pinned, as indicated at 9 and 10, to a main cylinder 11 and piston-rod 12, respectively, the latter at one end being bolted, as shown, to the main piston 13, and at the other end being provided with a bifurcation or fork 14, embracing opposite sides of the bent end of the left-hand (Figure 1) lever or tong 1. By the means just described, when air under pressure is supplied to the space between the closed end of the socketlike cylinder 11 and the piston 13, the work-engaging ends of the levers or tongs may be approached and the molds (or other articles therebetween) closed and gripped tightly while thumb-clamps are inserted in slots therein (or other suitable treatments are bestowed on the articles).

To open the work-engaging extremities of the levers or tongs 1, a constant pressure means, preferably a second fluid pressure device is provided, comprising a relatively small cylinder 15, one end of which is closed, as indicated at 16, and the bore of which is filled by a piston or plunger 17. While the plunger 17 may be of any suitable form or construction, one end of it is preferably reduced, as indicated at 18, this end being adapted to bear upon the rear of the main piston 13, and move the same to the right, as viewed in Figure 1. The main piston 13 and plunger or auxiliary piston 17, are each desirably provided with packing-rings 19 and 20, respectively. The cylinder 15 is supported by being bolted to a plate 21, which is screwed fast, as indicated at 22, to the ends of a pair of bars 23, which are bolted, as indicated at 24, fast to the outside of the main cylinder 11. By this means, the cylinders 15 and 11 are secured together rigidly with their bores in parallel relation. In each of the side bars 23 is provided a guideway 25, in which track rollers 26 on opposite ends of the pin 10, which operatively connects the piston-rod 12 and the left-hand lever or tong 1 (location referring to Figure 1). Inasmuch as the pins 9 and 10 on the rear bent ends of the levers or tongs support both of the fluid pressure devices, there is no binding or cramping of the parts when the main and auxiliary pistons 13 and 17, respectively, are operating.

Figure 2:
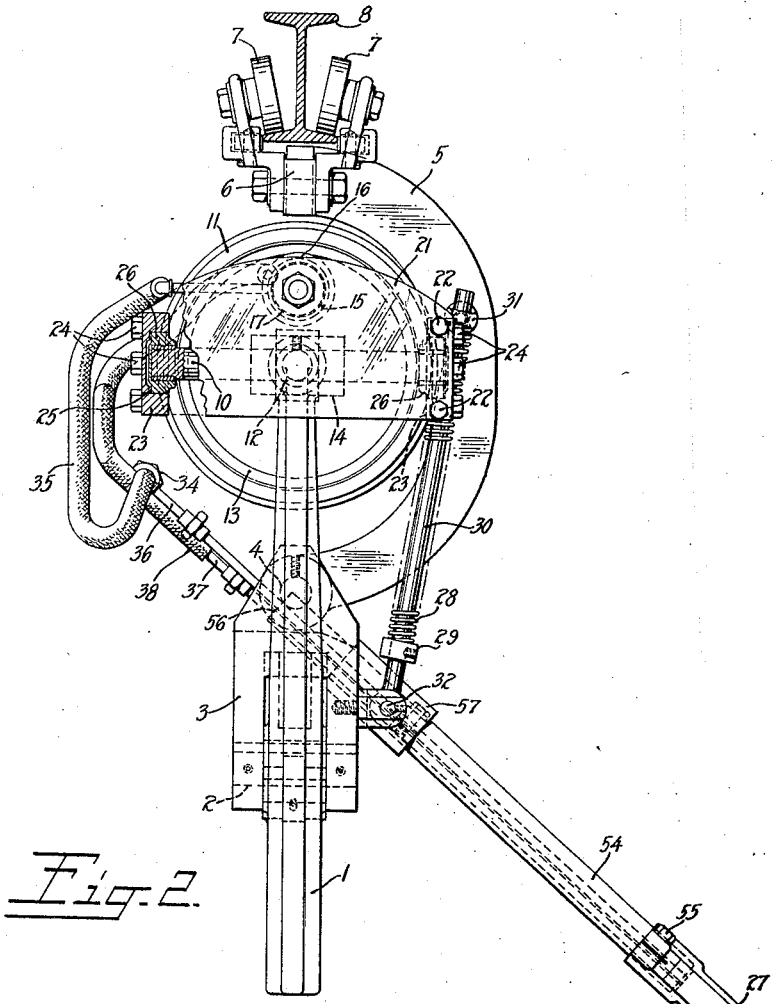
Figure 2 is an end elevation of the device.

In the upright position of the levers 1, illustrated in Figure 2, the center of gravity lies a little to the right of a vertical plane passing through the tongs and the device as a whole remains in this location, steadied against the hanger 5. When the apparatus as a whole is tilted about its fulcrum 4, as it may be by lifting upon the handle 27, a spring 28 is compressed between a collar 29, fast on a rod 30, and a guiding-eye 31, which is anchored to the hanger 5, the rod 30 being loosely pinned at 32 to the head or casting 3. The center of gravity of the movable parts is shifted to a position substantially vertically above the axis of the pin 4 in compressing the spring 28, whose strength is insufficient to move the parts in this canted position, but is sufficient to assist the operator, when he pulls down upon the handle 27, in moving the levers or tongs 1 to the vertical position shown in Figure 2.

Figure 1:
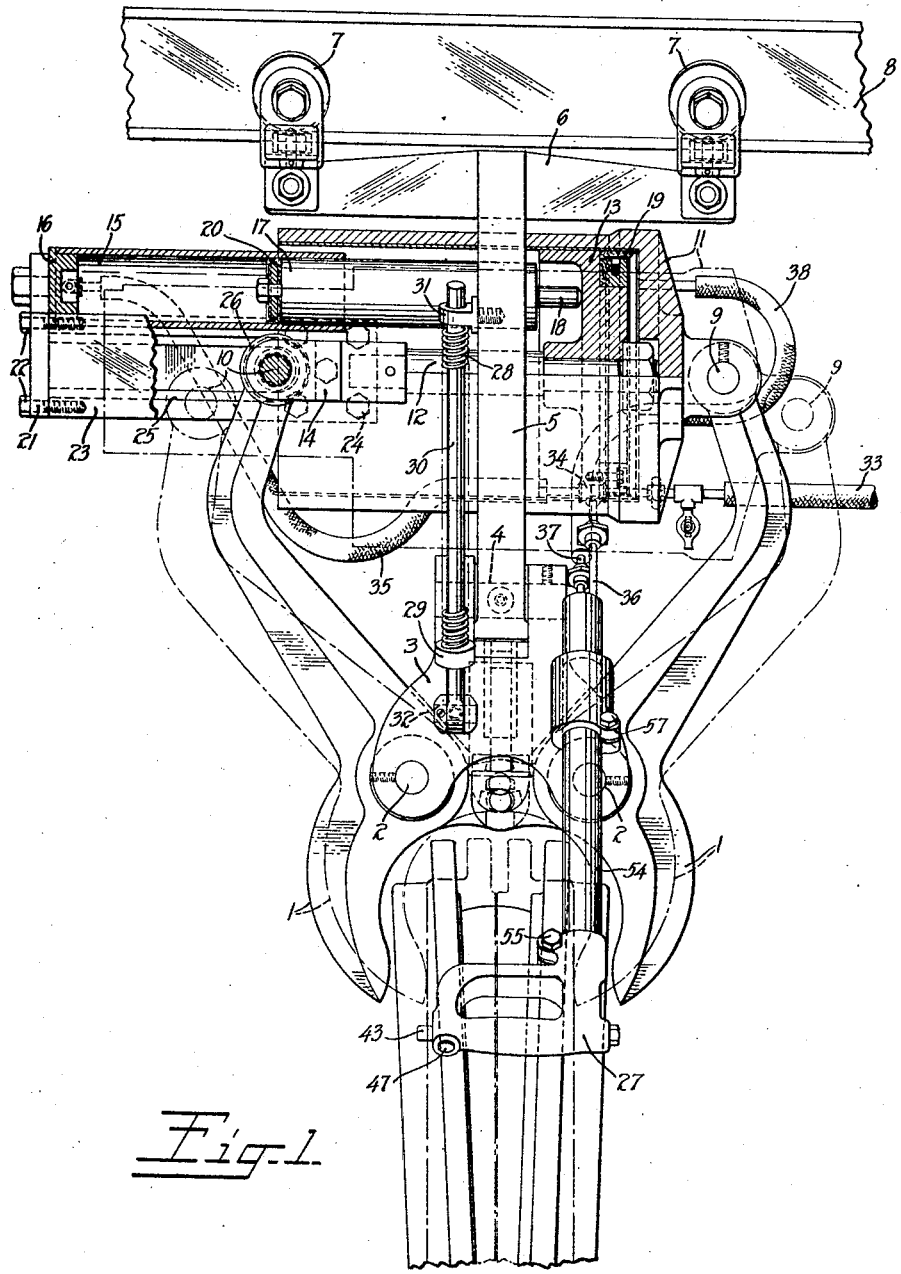
Figure 1 is a front elevation, partly in section, of the device, the levers or tongs appearing in working relation to a mold, and solid and dash lines indicate the positions of the parts at the start and finish of a mold-closing operation.

Suitable conduits and piping connections for supplying fluid under pressure, such as water or air, the latter preferably, will now be described. Referring to Figure 1, a supply-line is indicated at 33, this being connected with a T 34, which allows fluid under pressure to be constantly supplied through a flexible conduit 35 to the rear end of the relatively small piston or plunger 17, which is consequently constantly urged to the right, as viewed in Figure 1, and yieldingly opposes motion of the main piston at all times. The T 34 is also constantly in communication with a pipe 36, which communicates with a controlling mechanism, the details of which appear in Figure 3, and through this to a second pipe 37 flexibly connected, as indicated at 38, to the main cylinder 11.

The controlling mechanism illustrated in Figure 3 and located in the aforementioned handle 27, for operating the levers and fluid pressure devices as a unit, comprises a spring-pressed valve 39 adapted to seat, when free, upon the port 40, through which passes the reduced end 41 of an operating stem 42, which is connected directly to and operated by a press-button 43. The stem 42 is shaped as shown and encircled by a spring 44 confined between the button 43 and an apertured collar 45 anchored by the set screw 46. A second button 47 is provided, which is bored out, as indicated at 48, to receive or pass the button 43, one side of the enlarged hole 48 having an inward projection 49, which is adapted to be forced by a spring 50 into a circular groove 51 provided in the button 43.

The controlling mechanism illustrated in detail in Figure 3, permits the air supplied to the pipe 36 to pass through the port 40 when the valve 39 is raised, as shown in Figure 3, thence through the port 52 to the pipeline 37, which is at all times in communication with the main cylinder. The valve 39 is opened by pushing on the button 43 until the lug 49 seats in the groove 51 and detains the stem 42 in the position shown in Figure 3, where the reduced extremity 41 of the stem 42 holds the valve 39 from its seat 40 against the force of its own spring. In this position of the parts, which is shown in Figure 3, the spring 44 around the stem 42 is under compression but rendered ineffective by the locking action of the spring-pressed detent 49. When the operator observes that the levers or tongs are closed, operations are performed on the mold, such as inserting bolts in slots.

The levers or tongs are separated by pressing on the second button 47 and freeing the spring 44 which moves the stem 42 to the left, as viewed in Figure 3, thereby placing the air under pressure within the main cylinder 11 through the pipe line 37 in communication with the exhaust line 53, which vents into the hollow sleeve 54. This sleeve 54 houses the pipes 36 and 37, and is clamped, as indicated at 55, to the handle 27 and, as indicated at 57, to the casting or head 3, the sleeve 54 having an open end 56 discharging the air (if that is employed as the operating fluid under pressure) away from the operator.

The operation of the device is believed to have been sufficiently set forth in connection with the detailed description and no further explanation thereof is thought to be necessary.

The invention is not limited to the details of construction previously set forth, in its broadest aspects including any fluid pressure operable device set between and linking the rear ends of the levers for instance, or such alternatives as the substitution of a spring for the auxiliary or small cylinder. Air is the preferred fluid under pressure for operating the device but, of course, water under pressure could be employed. As before intimated, the manner of rendering the grappling device portable may be varied. The carriages 6, for instance, might be linked to an endless chain dragging the grapples along in synchronism with a conveyor located below them and carrying the molds or other articles, or the grapples on an endless chain might be conducted through a long heater. In other words, the invention is intended for use in all relations to which it may be adapted. Reference should therefore be made to the accompanying claims for an understanding of the scope of the invention.

Having thus described my invention, what I claim and desire to protect by Letters Patent is:—

1. A grappling device having a pair of articulated levers, means for actuating the levers, a carriage movably supporting the levers and their operating means, and a pivotal connection between the levers and the carriage permitting the levers to be swung bodily in a plane transverse the plane in which they are separately actuatable.

2. A grappling device having a pair of levers, a head to which said levers are pivoted intermediate their length, a carriage with a depending portion to which said head is hinged to permit the levers to be swung in a direction transverse a plane containing both of them, and means supported by the levers for actuating them.

3. A grappling device having a pair of levers, a head to which said levers are pivoted intermediate their length, a carriage with a depending portion to which said head is hinged to permit the levers to be swung in a direction transverse a plane containing both of them, means supported by the levers for actuating them, and means maintaining the levers in either an upright or canted position.

4. A grappling device having a pair of articulated levers, a fluid pressure device for actuating the levers in one direction, and means constantly urging the levers in the opposite direction.

5. A portable grappling device having a pair of articulated levers for shifting parts of an article, a travelling carriage pivotally supporting said levers and permitting them to be moved bodily to a position adjacent the work, and means directly connected with the levers for actuating them, said last-named means being movable with the levers in a plane transverse that in which they are actuated to engage an article.

6. A grappling device having a pair of articulated levers, in combination with, means supported by the levers for actuating them, said means including a fluid pressure operable device, means for supplying fluid at will to said device, and means constantly opposing said fluid pressure operable device normally urging the articulated levers to one extreme of their movement.

7. A grappling device having a pair of articulated levers, in combination with, means supported by the levers for actuating them, said means including a main cylinder and piston, an auxiliary cylinder and piston, and piping connections for supplying fluid under pressure at will to the main cylinder and constantly to the auxiliary cylinder.

8. A grappling device having a pair of articulated levers, in combination with, means supported by the levers for actuating them, said means including a main cylinder and piston, an auxiliary cylinder and piston, said levers being pivoted to the main cylinder and piston respectively, and piping connections for supplying fluid to said cylinders.

9. A grappling device having a pair of articulated levers, in combination with, means supported by the levers for actuating them, said means including main and auxiliary fluid pressure operable cylinders and pistons, the cylinders being rigidly secured together in parallel relation, said levers being directly connected to the main cylinder and piston respectively, said auxiliary piston being adapted to engage and oppose movement of said main piston, and means for supplying fluid under pressure at will to the main cylinder and constantly to the auxiliary cylinder.

10. A grappling device having a pair of articulated levers, in combination with, means supported by the levers for actuating them, said means including a main cylinder and piston pivotally connected to the respective levers, means for maintaining the axis of the main cylinder in intersecting relation with the axes of the pivotal connections between the levers and the main cylinder and its piston, means for conducting fluid under pressure at will to and from the main cylinder to actuate the levers by power in one direction and to vent the main cylinder to actuate the levers by power in one direction and to vent the main cylinder to facilitate actuation of the levers in the opposite direction, and means constantly urging the main piston in said opposite direction.

11. A grappling device having a pair of articulated levers, in combination with, means supported by the levers for actuating them, said means including a main cylinder and piston respectively pivoted to said levers, an auxiliary cylinder and piston, means fixed to the main cylinder for supporting said auxiliary cylinder parallel therewith, said last-named means being provided with a guideway, the pivotal connection between the main piston and one of the levers having an extension entering said guideway for maintaining the main cylinder parallel to a line passing through the pivotal connections between the main cylinder and its piston and the levers, and means for supplying fluid under pressure to the cylinders.

12. A grappling device having a pair of articulated levers, in combination with, means supported by the levers for actuating them, said means including a main cylinder and piston, yielding means constantly opposing movement of the main piston, means for supplying or exhausting fluid under pressure from the main cylinder including supply and exhaust lines and a valve in the line of supply, and a digit operable member for governing said valve, said digit operable member being provided with a member for closing off or opening the exhaust line.

13. A grappling device having a pair of levers, a head on which said levers are fulcrumed, means pivotally supporting said head for swinging movement in a direction at right angles to the plane of said levers, means movable with the levers for actuating them, a handle connected to said head for swinging the levers and head about the pivotal support of the latter, and means carried by the handle and operable by the digits of an operator's hand for governing the actuation of the levers.

14. A grappling device having a pair of articulated levers, and means supported by the levers for actuating them, said means including a main cylinder and piston, yielding means constantly opposing movement of the main piston, means for supplying or exhausting fluid under pressure from the main cylinder including supply and exhaust lines and a valve in the line of supply, a digit operable member for governing said valve, said digit operable member being provided with a member for closing off or opening the exhaust line, and a detent for holding the digit operable member in a position in which air under pressure is in communication with the main cylinder and the exhaust line is closed.

Signed at Hartford, county of Hartford and State of Connecticut, this 26th day of May, 1923.

HECTOR V. LOUGH.